United States Patent

[11] 3,621,073

| [72] | Inventors | Brian Patrick McGrath<br>Crowthorne;<br>Keith Vaughan Williams, Shepperton, both of England |
|---|---|---|
| [21] | Appl. No. | 757,483 |
| [22] | Filed | Sept. 4, 1968 |
| [45] | Patented | Nov. 16, 1971 |
| [73] | Assignee | The British Petroleum Company Limited |
| [32] | Priority | Sept. 22, 1967 |
| [33] | | Great Britain |
| [31] | | 43,177/67 |

[54] PROCESS FOR PRODUCING 2-METHYL-BUTENE-2 FROM BUTENE STREAMS
18 Claims, No Drawings

[52] U.S. Cl. .................................................. 260/683 D,
260/677 H, 260/680 D, 260/683.2
[51] Int. Cl. ....................................................... C07c 3/62,
C07c 11/18

[50] Field of Search .......................................... 260/683 D,
677 H, 680 D, 683.2

[56] References Cited
UNITED STATES PATENTS

| 2,952,719 | 9/1960 | Appell ........................ | 260/683.2 |
| 2,959,627 | 11/1960 | Fleming et al. .............. | 260/677 |
| 3,207,808 | 9/1965 | Bajars .......................... | 260/680 |
| 3,393,251 | 7/1968 | Fenton ......................... | 260/683.15 |

*Primary Examiner*—Paul M. Coughlan, Jr.
*Attorney*—Morgan, Finnegan, Durham & Pine ABSTRACT: A mixture of normal and isobutenes is converted to 2-methylbutene-2 in a series of steps comprising purification, isomerization of butene-1 to butene-2 at a temperature below 0° C. using a catalyst comprising alkali metal treated alumina and reaction of butene-2 with isobutylene using a disproportionation catalyst comprising rhenium heptoxide on alumina.

The 2-methylbutene-2 can be dehydrogenated to isoprene.

PROCESS FOR PRODUCING 2-METHYL-BUTENE-2 FROM BUTENE STREAMS

This invention relates to a process for the production of 2-methylbutene-2.

British Pat. No. 1,064,829 discloses and claims a process for the preparation of olefins which process comprises reacting an initial mixture of two dissimilar acyclic olefins having the formulas $RR_1C=CR_2R_3$ and $R_4R_5C=CR_6R_7$ respectively, in the presence of an olefin disproportionation catalyst, the R substituents of the feed olefins representing hydrogen atoms or alkyl or aryl groups, with the proviso that not more than two of the groupings $RR_1C=R_3R_2C=$, $R_4R_5C=$ or $R_7R_6C=$ are the same.

A disproportionation catalyst is a catalyst which is capable of effecting conversion of an olefin to a mixture of olefins having higher and lower carbon numbers than the feed olefin. Such catalysts include mixtures of molybdenum oxide and alumina, preferably containing cobalt oxides, and optionally containing minor amounts of alkali metal or alkaline earth metals; molybdenum, tungsten or rhenium carbonyls supported on alumina, silica or silica-alumina; tungsten oxide supported on alumina and rhenium heptoxide supported on alumina.

It is an object of the present invention to provide a process for the production of 2-methylbutene-2 by the reaction of butene-2 and isobutene.

It is known that certain olefins, e.g., isobutene, polymerize very readily. For this reason it has not until recently been possible to coreact a mixture of olefins containing an easily polymerizable olefin over a disproportionation catalyst without substantial polymerization of the feed occurring. In British Pat. No. 1,159,056 it is disclosed that if a rhenium heptoxide on alumina catalyst contains also a minor proportion of alkali or alkaline earth metal ions, it is suitable for use as a catalyst for the coreaction of an olefin mixture containing an easily polymerizable olefin and does not polymerize the olefin to any great extent.

According to the present invention there is provided a process for the production of 2-methylbutene-2 comprising the following steps:

1. Subjecting a feedstock containing a mixture of normal and isobutenes to a purification step, which purification step comprises removing dienes and acetylenes,
2. Isomerizing butene-1 to butene-2 by contacting the purified feedstock at a temperature below 0° C. with a catalyst comprising alumina treated with an alkali metal,
3. Reacting butene-2 with isobutene in the presence of a disproportionation catalyst comprising rhenium heptoxide on alumina, said alumina also containing a minor proportion of alkali or alkaline earth metal ions to give propylene and a branched chain $C_5$ olefin,
4. Separating the branched chain $C_5$ olefin. This can be dehydrogenated to yield isoprene.

Suitable feedstocks are any which contain normal butenes and isobutene, either alone or in admixture with paraffins or minor amounts of other olefins. Especially suitable feedstocks are those rich in normal butenes and isobutene and preferably with an isobutene to normal butene molar ratio of about 1. Such a feedstock may be derived either by blending two or more sources of butenes or conveniently as a raffinate stream from other operations such as steam or catalytic cracking.

Butene streams commonly contain various amounts of dienes and acetylenes which are catalyst poisons and, for maximum efficiency of the process, these must be reduced to suitably low levels, the actual value of which will vary, but in general will be in the range 0 to 500 parts per million by weight of the feedstock. Thus the feedstock is subjected to a pretreatment purification process prior to the reaction of butene-2 with isobutene. Any process which effects this reduction in dienes or acetylenes may be used, but a particularly suitable process is described in British Pat. No. 1,110,826.

Butene-1 reacts readily with butene-2 over disproportionation catalysts to yield propylene and pentene-2 and in the present invention this reaction is undesirable. Thus the feedstock is subjected to an isomerization step after the purification pretreatment but before the reaction of stage 3.

British Pat. No. 1,110,826 referred to above discloses a process which comprises passing a mixture of butenes over a supported nickel catalyst in which the nickel under the operating conditions, is present in major proportion as elemental nickel, the catalyst having been previously modified by treatment with (a) elemental sulfur or (b) an organic sulfur compound or (c) $H_2S$ or (d) $CS_2$ or (e) a mixture or two or more components selected from (a), (b), (c) and (d), the treatment being carried out under such conditions that the atomic ratio of sulfur to nickel in the treated catalyst is in the range 0.01 to 0.4. This process has the advantage of simultaneously effecting the purification step and partly isomerizing butene-1 to butene-2.

However for maximum selectivity to methylbutenes in the reaction in step (3), an additional isomerization process is included which operates at temperature substantially lower than are practicable with the sulfided nickel on sepiolite catalyst. Catalyst capable of isomerizing olefins are disclosed in U.S. Pat. No. 2,265,689 and British Pat. No. 842,136. In these cases isomerization is effected over alumina treated with an alkali metal. However British Pat. No. 842,136 is limited to a temperature of 0° C. or above for the isomerization step. The catalyst used in the present invention is preferably one containing 0.02 to 5 percent by weight of potassium on alumina and is capable of isomerizing n-butenes at temperatures well below 0° C. where the thermodynamic equilibrium concentration of butene-1 in total n-butenes is very low. Low-temperature isomerization thus favors the formation of butene-2 at the expense of butene-1. The temperature of isomerization is preferably below −15° C. and more preferably in the range −25° C. to −40° C. It is not necessary for the feed to be partially isomerized during the first purification step (1) and where a nonisomerizing purification process is used, all isomerization may be carried out in one low-temperature process.

The preferred disproportionation catalyst for the first stage is rhenium heptoxide on an alumina modified with sodium ions as described in British Pat. No. 1,159,056.

The catalyst suitably contains 0.1–40, preferably 1–20 parts by weight of rhenium heptoxide per 100 parts by weight of alumina.

The optimum metal ion content depends upon the particular metal ion.

Catalysts containing too little metal ion will retain some polymerization activity whilst those containing too much will have a reduced catalytic effect on the coreaction of the butenes.

Sodium, potassium and calcium are suitable ions. In these instances, the catalyst should contain 0.02–5.0 percent by weight of metal ion, preferably 0.1–1.0 percent by weight.

The incorporation of the alkali or alkaline earth metal ions into the catalyst support may be brought above by known methods, for example, by treating the support with an aqueous solution of an alkaline metal salt such as sodium carbonate, sodium bicarbonate or sodium acetate, and separating the solid catalyst from the liquid medium, followed by drying.

Before use in the reaction, the catalyst may be subjected to thermal activation, either in a stream of inert gas such as nitrogen, carbon dioxide or helium, or preferably in a stream of air or oxygen followed by final treatment in an inert gas. Suitably the catalysts are treated in air at a temperature of 300°–900° C. for 1 minute to 20 hours and then under similar conditions in an inert gas such as nitrogen.

The conditions under which the butene-2 and isobutene react may vary with the composition of the feed. Reaction temperatures may range from −50° to 500° C., temperatures in the range 0° to 100° C. being preferred.

Reaction pressures may be subatmospheric, atmospheric or superatmospheric. Preferred pressures are those which just maintain the reaction in the liquid phase. In a continuous process, reaction times may vary between 0.01 seconds and 10 hours, preferably between 0.1 seconds and 10 minutes.

In a batch process, suitable olefin/catalyst weight ratios are in the range 1000:1 to 1:1. If desired, the process may be carried out in the presence of an inert diluent, for example a paraffinic or cycloparaffinic hydrocarbon.

The feedstock for stage 4 comprises a $C_5$ olefin fraction isolated from the product of the third stage. The separation of this fraction may be arranged to yield a substantially pure methylbutene fraction or a fraction comprising both linear and branched $C_5$ olefins. The isoprene-containing product may vary in purity and may be subjected to a final purification step to yield isoprene of higher purity.

The separation of the methylbutenes from the product of the third stage may be performed by methods well known in the art, e.g., solvent extraction, urea adduction or fractional distillation.

The dehydrogenation of the methylbutenes to isoprene may be accomplished by passing the methylbutenes over calcium nickel phosphate, chromia alumina or iron oxide catalysts at high temperatures. Suitable methods of dehydrogenation are, for example, those disclosed in British Pat. Nos. 824,237 and 795,047 which disclose the dehydrogenation of olefins to conjugated dienes by passing a mixture of steam and mono-olefin through a catalyst bed of granular calcium nickel phosphate.

The catalyst may comprise a normal calcium nickel phosphate material which is formed by precipitation from a nonacidic aqueous medium and which contains an average of from 6.5 to 12, usually 7.5 to 9.2, atoms of calcium per atom of nickel. They may consist entirely of such calcium nickel phosphates, but usually minor amounts, e.g., 0.05 to 30 percent by weight of chromium oxide is added as a promoter. The catalyst may be in the form of pellets or tablets. Such catalysts and the methods of making them are well known.

Iodine, either alone, or in admixture with oxygen, may be used in the dehydrogenation process. When used alone one atom of iodine will react with each atom of hydrogen from the methylbutenes being dehydrogenated. Thus it will be necessary to provide two atoms of iodine for each mol of methylbutene.

A suitable dehydrogenation process is that disclosed in U.S. Pat. No. 3,080,435 in which process the compound to be dehydrogenated in admixture with free oxygen is intimately contacted with a molten metal iodide at an elevated temperature at which oxygen liberates free iodine from the metal iodide.

Also suitable is the dehydrogenation process disclosed in U.S. Pat. No. 3,207,808 which relates to a process for the dehydrogenation of, inter alia, methylbutenes to isoprene, which process comprises heating in the vapor phase at above 400° C. an aliphatic hydrocarbon of 4 to 6 carbon atoms, e.g., a methylbutene, with oxygen in a molar ratio of greater than one fourth of a mol of oxygen per mol of said aliphatic hydrocarbon, at least about 0.001 to 0.05 mol of iodine per mol of said aliphatic hydrocarbon, the initial partial pressure of said aliphatic hydrocarbon being equivalent to no greater than about 10 inches of mercury at 1 atmosphere total pressure, with a solid catalyst consisting essentially of a member selected from metals, oxides, hydroxides and salts of titanium, zirconium, vanadium, niobium, tantalum, chromium, tungsten, molybdenum, manganese, thorium, uranium, lanthanum series elements, and mixtures thereof, the ratio of mols of said oxygen to mols of said iodine being greater than 2, the said catalyst surface being present in an amount of greater than 40 sq. ft. of catalyst surface per cu. ft. of reaction zone.

The isoprene may be separated from the products of the dehydrogenation stage by the method disclosed in British Pat. No. 867,296.

The invention is illustrated but not limited by the following example.

A feedstock having the composition shown in column (a) of the table was subjected to a purification step to give a feedstock of composition shown in column (b). After a low-temperature isomerization step to convert butene-1 to butene-2 the feedstock analysis was as shown in column (c). After reaction of the isobutene and butene-2, fractional distillation and dehydrogenation, the composition of the product was given in columns (d), (e) and (f) respectively. The reaction conditions of each step are as follows:

(a)–(b) Purification/Isomerization

Catalyst: Sulfided nickel on sepiolite prepared by reducing nickel ammonium formate on sepiolite at 250° C. with hydrogen (GHSV 100) to give 9.6 percent weight Ni on sepiolite and treating this with gaseous tetrahydrothiophen (0.12 ml. liquid/ml. catalyst) in hydrogen (GHSV 100) over 24 hours at 100° C. The final catalyst had a S/Ni atomic ratio of 0.07.

Reaction: Inlet temperature 80° C.; 100 p.s.i.g.; LHSV total $C_4$, 2.5; $H_2/C_4$ (moles), 0.05.

(b)–(c) Low-Temperature Isomerization

Catalyst: Potassium on alumina, prepared by stirring potassium metal with alumina at 350° C. until a blue-grey color developed. From the quantity of hydrogen liberated from n-butanol by the catalyst, it was found to contain 1.4 percent weight of active potassium.

Reaction: −30° C., LHSV 10, 150 p.s.i.g.

(c)–(d) Reaction in the presence of disproportionation catalyst

Catalyst: 10 percent weight $Re_2O_7$. $Al_2O_3$ prepared by impregnating sodium-ion modified alumina with aqueous ammonium perrhenate, followed by drying and activation in air (GHSV 2000) for 24 hours, and then nitrogen (GHSV 2000) for 1 hour, both at 580° C. Reaction: 25° C., 150 p.s.i.g., HLHSV 10.

(d)–(e) Separation of 2-methylbutene-2

The product stream from the disproportionation reaction was expanded to atmospheric pressure and chilled to −40° C. to give an unstable liquid product containing mainly butenes and pentenes. This was distilled, through a 4-feet ×1¼-inch lagged column packed with ¼-inch ×⅛-inch Dixon gauze rings, with a reflux ratio of 10 to 1. Most of the $C_5$ was obtained as a fraction comprising 99.5 percent by weight of 2-methylbutene-2.

(e)–(f) Dehydrogenation

Catalyst: 30 mls. of quartz wool were treated with 30 mls. of 10 percent weight solution of vanadium pentoxide in oxalic acid. Surplus liquid was decanted off and the impregnated wool was dried and heated in air at 500° C. for 2 hours.

Reaction: A gaseous mixture of 2-methylbutene-2 (0.175 moles), 1-iodobutane (0.015 moles), water (1.3 moles) and oxygen (0.13 moles) was passed over the vanadium catalyst at 500° C. and a GHSV of about 3000 (measured at room temperature). The product stream was analyzed without separation.

DIAGRAM ILLUSTRATING PROCESS SEQUENCE AND PRODUCT COMPOSITION FOR ISOPRENE PROCESS

| Notes | (a) | (b) | (c) | (d) | (e) | (f) |
|---|---|---|---|---|---|---|
| $C_1/C_2$ | | | | 0.5 | | 0.8 |
| Propylene | Trace | Trace | Trace | 15.8 | | |
| n-Butane | 6.4 | 6.5 | 6.5 | 6.5 | | |
| Isobutane | 1.1 | 1.1 | 1.1 | 1.1 | | |
| Butene-1 | 22.6 | 3.8 | 0.4 | 0.1 | | |
| Butene-2 | 24.0 | 43.4 | 46.8 | 31.5 | | |
| Isobutene | 45.3 | 45.3 | 45.3 | 25.2 | | |
| Butadiene | 0.6 | (¹) | | | | |
| Isopentenes ² | Trace | Trace | Trace | 18.1 | 99.5 | 30.9 |
| n-Pentenes ³ | | | | 0.2 | 0.5 | 0.5 |
| >$C_5$ | Trace | Trace | Trace | 1.0 | | 0.1 |
| Isoprene | | | | | | 59.4 |
| n-Pentadienes | | | | | | 0.3 |
| | 100.0 | 100.1 | 100.1 | 100.0 | 100.0 | 100.1 |

¹ <5 p.p.m.
² Predominantly 2-methyl-butane-2.
³ Predominantly pentene.

What we claim is:
1. A process for the preparation of 2-methylbutene-2 from a feedstock containing normal butenes and isobutene comprising, in stages,
   a. isomerizing butene-1 to butene-2 by contacting the feedstock at a temperature below 0° C. with a catalyst comprising alumina treated with added alkali metal, and
   b. further reacting the product of stage (a) at a temperature in the range of about 0° to 100° C. at a pressure sufficient to maintain the reaction in the liquid phase, in the presence of a rhenium heptoxide-alumina catalyst comprising from about 0.1 to 40 parts by weight of rhenium heptoxide per 100 parts by weight of alumina, whereby butene-2 reacts with isobutene to form propylene and 2-methylbutene-2, and
   c. separating the 2-methylbutene-2.
2. A process as in claim 1 wherein the feedstock is purified prior to stage (a) to reduce the content of dienes and acetylenes in the feedstock to not more than about 500 parts per million.
3. A process according to claim 2 wherein the purification is effected by passing the feedstock over a supported nickel catalyst in which the nickel under the operating conditions, is present in major proportion as elemental nickel, the catalyst having been previously modified by treatment with (a) elemental sulfur or (b) an organic sulfur compound or (c) $H_2S$ or (d) $CS_2$ or (e) a mixture of two or more components selected from (a), (b), (c), and (d), the treatment being carried out under such conditions that the atomic ratio of sulfur to nickel in the treated catalyst is in the range 0.01 to 0.4.
4. A process as in claim 1 wherein the 2-methylbutene-2 is separated out by solvent extraction.
5. A process as in claim 1 wherein the 2-methylbutene-2 is separated out by urea adduction.
6. A process as in claim 1 wherein the 2-methylbutene-2 is separated out by fractional distillation.
7. A process according to claim 1 wherein the feedstock contains a mixture of normal butenes and isobutene with a molar ratio of isobutene to normal butene of about 1.
8. A process according to claim 1 wherein the catalyst in stage (a) comprises from about 0.02 to 5 percent by weight potassium on alumina and the stage *a* reaction is carried out at a temperature below −15° C.
9. A process according to claim 8 wherein the temperature is in the range −25° to −40° C.
10. A process according to claim 1 wherein the stage (b) catalyst is rhenium heptoxide on an alumina modified with sodium, potassium or calcium ions.
11. A process according to claim 10 wherein the stage (b) catalyst contains 1–20 parts by weight of rhenium heptoxide per 100 parts by weight of alumina.
12. A process according to claim 11 wherein the stage (b) catalyst contains 0.02 to 5 percent by weight of sodium, potassium or calcium ions.
13. A process according to claim 12 wherein the stage (b) catalyst contains 0.1 to 1.0 percent by weight of sodium, potassium or calcium ions.
14. A process according to claim 12 wherein the stage (b) catalyst is activated by treatment in air at 300°–900° C. for 1 minute to 20 hours and then in an inert gas.
15. A process according to claim 1 wherein the stage (b) pressure is just sufficient to maintain the reaction in the liquid phase.
16. A process according to claim 1 wherein the stage (b) reaction time is between 0.1 seconds and 10 minutes.
17. A process according to claim 1 wherein in a batch process the weight ratio of olefin to rhenium heptoxide-alumina catalyst is in the range 1000:1 to 1:1.
18. A process according to claim 1 wherein stage (b) is effected in the presence of an inert diluent.

* * * * *